UNITED STATES PATENT OFFICE.

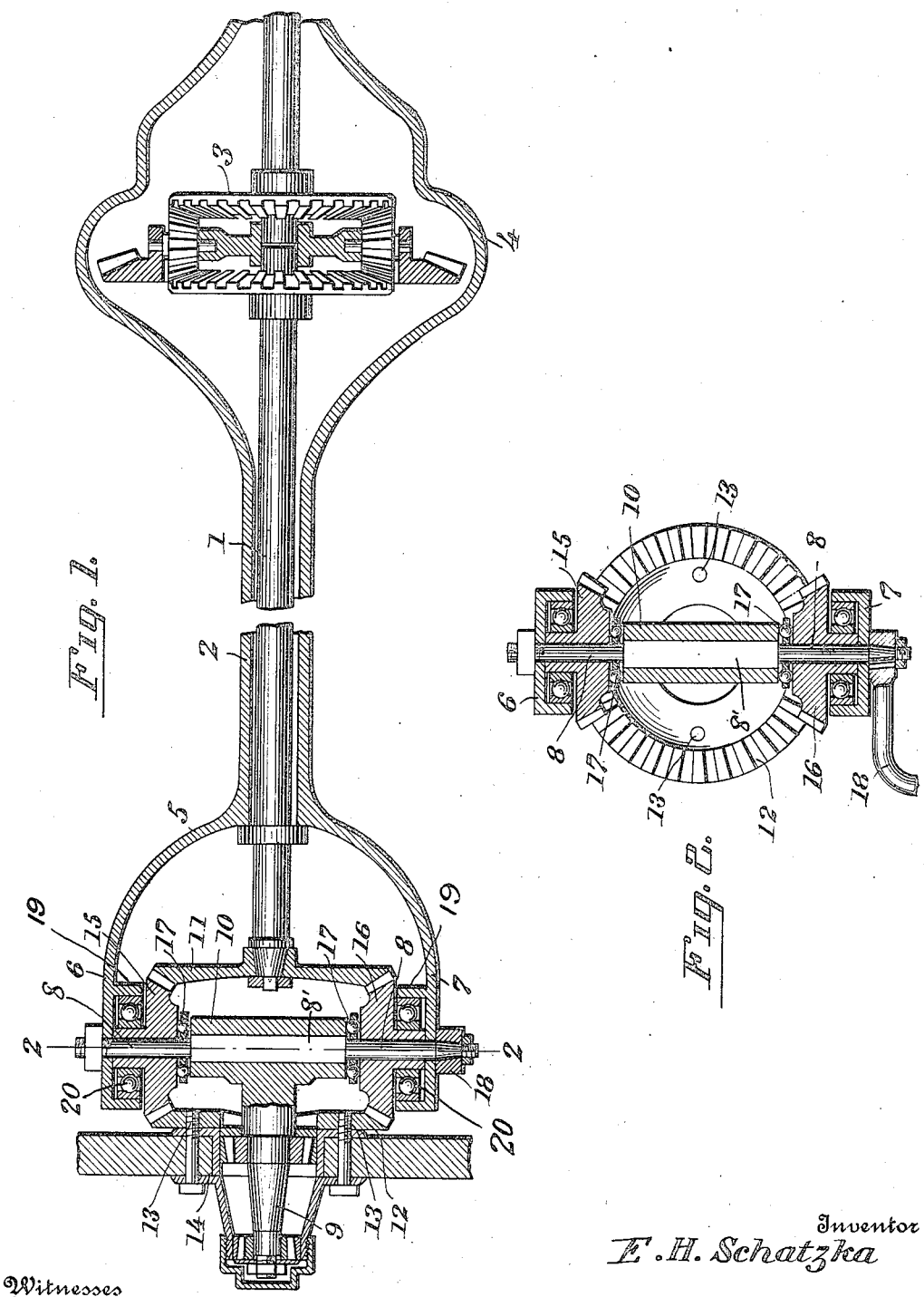

EMIL H. SCHATZKA, OF WESTFIELD, WISCONSIN.

FOUR-WHEEL DRIVE FOR AUTOMOBILES.

1,175,826.

Specification of Letters Patent. Patented Mar. 14, 1916.

Application filed November 29, 1913. Serial No. 803,863.

*To all whom it may concern:*

Be it known that I, EMIL H. SCHATZKA, a citizen of the United States, residing at Westfield, in the county of Marquette and State of Wisconsin, have invented new and useful Improvements in Four-Wheel Drives for Automobiles, of which the following is a specification.

This invention relates to four-wheel driving mechanism for automobiles, the object of the invention being to provide mechanism whereby each of the steering wheels of the machine may be driven in conjunction with and in addition to the usual driving wheels, thereby giving greater tractive qualities to the machine as a whole and rendering the machine especially efficient for climbing steep grades and extricating itself from places in which it may become mired.

A special object of this invention is to produce a construction of driving mechanism for the steering wheels of an automobile which will permit the steering wheels to be turned to one side or the other for steering purposes with the same ease and absence of friction as the present steering wheels are capable of, where not equipped with the additional driving mechanism.

With the above and other objects in view, the invention consists in the construction, combination and arrangement of parts, as will hereinafter be more fully described, illustrated and claimed.

In the accompanying drawings:—Figure 1 is a vertical longitudinal section through the steering wheel axle housing, showing the steering wheel driving mechanism of this invention. Fig. 2 is a cross section on the line 2—2 of Fig. 1.

Referring to the drawings 1 designates the steering wheel axle which is inclosed by an axle housing 2, the axle 1 being made in sections and connected by differential gearing 3 arranged in a housing 4, all of the parts thus far referred to being of the same construction and arrangement as is now present in the rear axle construction of automobiles.

In carrying out the present invention the axle housing 2 is provided at each end with a substantially semi-circular yoke 5 embodying the top and bottom arms 6 and 7, respectively.

Passing through the top and bottom arms 6 and 7 is a pivot shaft 8 having a non-circular portion 8′ and round end portions.

The knuckle comprises the usual spindle 9 and the vertically extending portion 10 which in this instance constitutes the knuckle shaft and has a non-circular bore therethrough to receive the corresponding portion 8′ of the shaft 8.

Fast on the outer extremity of the adjacent front axle section 1 is a bevel gear wheel 11 and opposite to said gear wheel 11 and in spaced relation thereto is another bevel gear wheel 12 of exactly the same size and number of teeth. The wheel 12 is bolted or otherwise fastened as shown at 13 to the hub 14 of the adjacent steering wheel, whereby the steering wheel and said bevel gear wheel 12 turn together.

Interposed between the bevel gear wheels 11 and 12 are bevel pinions 15 and 16 which are located at diametrically opposite points with respect to the wheels 11 and 12 with which they directly mesh at all times. The pinions 15 and 16 have their axes coincident with the shaft 8 and the axis of movement of the knuckle which carries the steering wheel. Therefore, the steering wheel may be turned to any desired angle without affecting the driving connection between the bevel gear wheels and pinions. End thrust ball bearings 17 are interposed between the opposite ends of the pinions 15 and 16 so as to sustain the weight of the machine without increasing to any appreciable extent the friction between the parts when the steering wheel is turned in one direction or the other by the operating arm 19 fast on one end of the shaft 8 and outside of the yoke 5. The pinions being located at diametrically opposite points distribute equally the strain and torsion to which the parts are subjected and materially assist in connection with the ball bearings 17 in keeping all parts in proper working relation so as to prevent binding and consequent friction. Furthermore, the construction as a whole is exceedingly compact and very simple and therefore not liable to get out of order.

Inwardly facing annular ball bearing retaining flanges 19 are formed on the top and bottom arms of the yoke 5 as illustrated in Figs. 1 and 2, and radial thrust ball bearings 20 are inserted and held within said flanges 19, said bearings being arranged beyond the outer faces of the bevel pinions 15 and 16. The bearings 17 take the end thrust on the pivot shaft 8 while the radial bearings 20 enable the knuckle to be turned with the greatest possible freedom.

What I claim is:—

Steering wheel driving mechanism for automobiles, comprising a steering wheel axle, an axle housing therefor, a bevel gear wheel fast on the extremity of said axle, a steering knuckle provided with a non-circular and substantially vertical bore extending entirely therethrough, a yoke on said axle housing within which said knuckle is journaled on a substantially vertical axis, a steering wheel, a bevel gear wheel bolted directly to the inside face of said steering wheel, a substantially vertical pivot shaft extending through said knuckle and having round end portions journaled in and extending through both arms of said yoke and having a non-circular portion extending entirely through the correspondingly shaped bore of the knuckle, nuts on the upper and lower extremities of said pivot shaft, bevel pinions interposed between and meshing with said bevel wheels at diametrically opposite points and journaled on the round end portions of said pivot shaft, inwardly facing annular retaining flanges on the upper and lower arms of the yoke, radial thrust ball bearings retained within said flanges and encircling the hubs of said bevel pinions, and end thrust ball bearings between said bevel pinions and the top and bottom ends of said knuckle.

In testimony whereof I affix my signature in presence of two witnesses.

EMIL H. SCHATZKA.

Witnesses:
HERMAN L. MILLER,
WALTER NUTTER.